United States Patent [19]
Maloizel

[11] Patent Number: 6,002,239
[45] Date of Patent: Dec. 14, 1999

[54] CHARGING CURRENT ADAPTER CIRCUIT FOR CELLS OR BATTERIES

[75] Inventor: Serge Maloizel, Trois Palis, France

[73] Assignee: Alcatel, Paris, France

[21] Appl. No.: 08/964,456

[22] Filed: Nov. 4, 1997

[30] Foreign Application Priority Data

Oct. 23, 1997 [FR] France ................................ 97 13288

[51] Int. Cl.⁶ .............................................. H01M 10/46
[52] U.S. Cl. ........................................................ 320/136
[58] Field of Search .................................... 320/116, 126, 320/128, 132, 135, 136, FOR 104, FOR 126, FOR 128

[56] References Cited

U.S. PATENT DOCUMENTS

| | | | |
|---|---|---|---|
| 4,056,764 | 11/1977 | Endo et al. | 320/101 |
| 4,246,529 | 1/1981 | Jurgens et al. | 320/139 |
| 5,488,284 | 1/1996 | Dias et al. | 320/162 |
| 5,623,196 | 4/1997 | Fernandez et al. | |
| 5,645,949 | 7/1997 | Young. | |

FOREIGN PATENT DOCUMENTS

| | | |
|---|---|---|
| 0 665 628 A2 | 8/1995 | European Pat. Off. . |
| 42 25 746 A1 | 2/1994 | Germany . |

OTHER PUBLICATIONS

S. M. Garrett et al, "Apparatus for Charging a Lithium Ion Battery in a Nickel System Charger", Motorola Technical Developments, vol. 28, Aug. 1996, pp. 95–97.

*Primary Examiner*—Edward H. Tso
*Attorney, Agent, or Firm*—Sughrue, Mion, Zinn, Macpeak & Seas, PLLC

[57] ABSTRACT

A cell charging voltage adapter circuit, and a battery including such a circuit, wherein the charging circuit includes terminals (2, 3) of resistor (8) between one of the connecting terminals (2; 3) and one of the output terminals (6; 7) and a comparator 910) between the connecting terminals and adapted to control the variable resistor in accordance with the results of comparing the voltage between the connecting terminals and a nominal voltage.

16 Claims, 2 Drawing Sheets

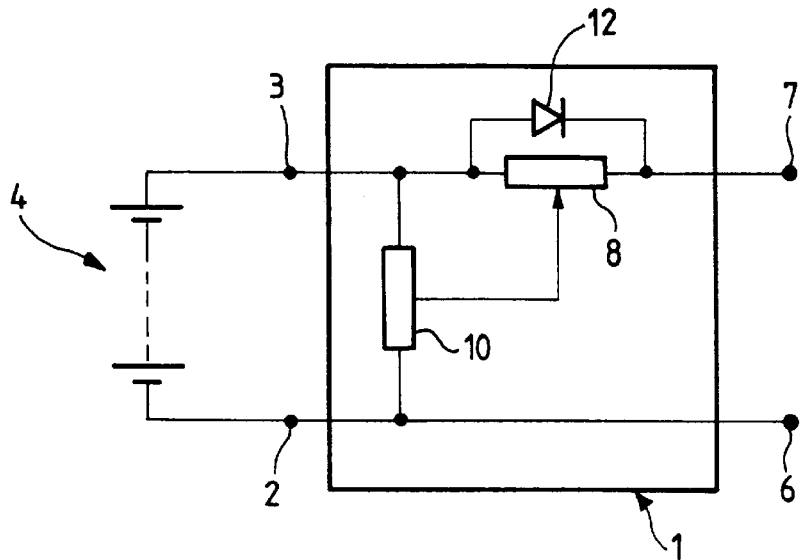
FIG_1
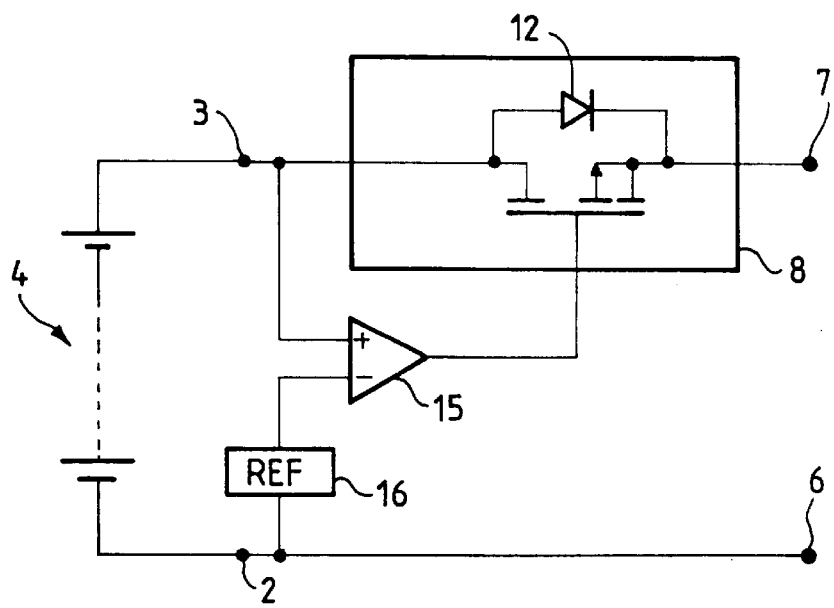
FIG_2
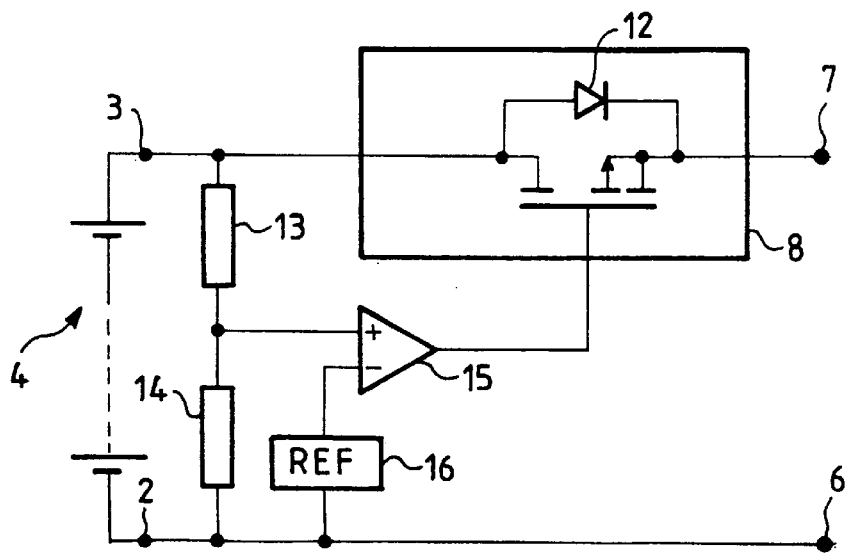
FIG_3

FIG_4
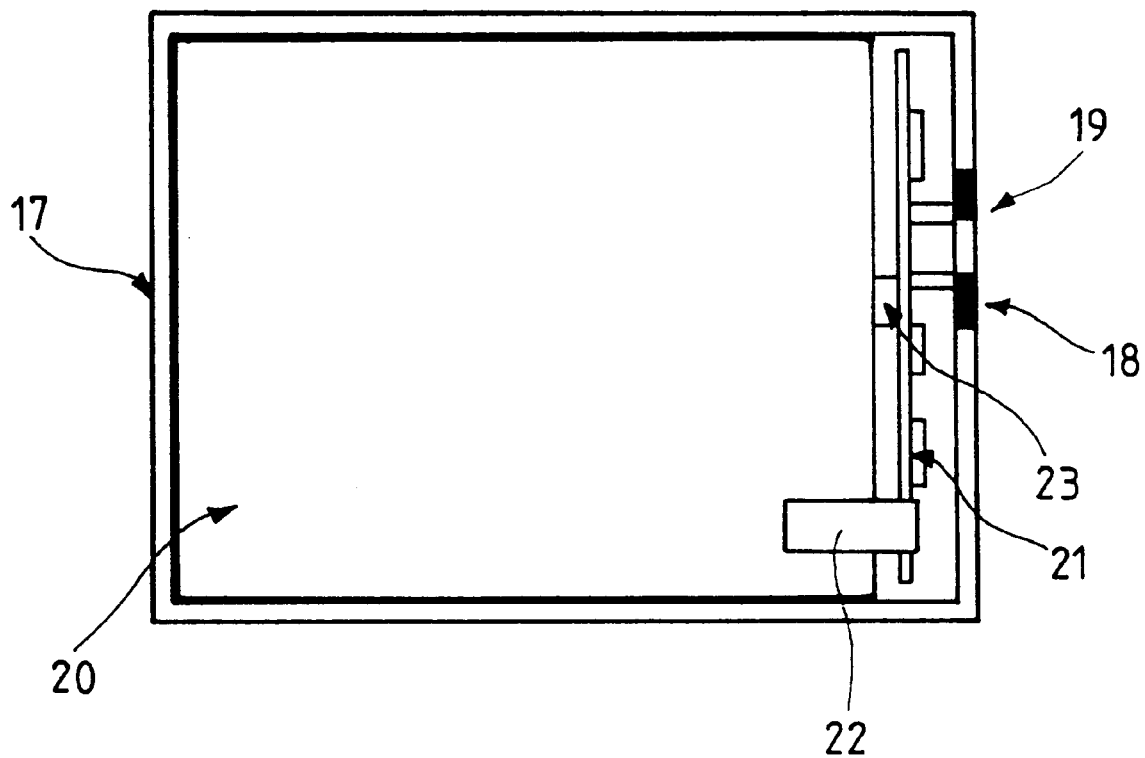

CHARGING CURRENT ADAPTER CIRCUIT FOR CELLS OR BATTERIES

BACKGROUND OF THE INVENTION

The present invention concerns a charging current adapter circuit for cells; it also concerns a battery including a charging current adapter circuit of this kind.

Cells, and in particular Li-ion cells, are increasingly used in domestic appliances and office equipment, and in particular in portable telephones. The charging voltage of such devices is conventionally 4.2 volts and conventional chargers for this type of cell are usually designed for a corresponding charging voltage. Lithium cells have recently been introduced with a charging voltage of 4.1 volts or 4.0 volts.

So-called "universal" charging devices can charge various types of cells; these devices include a thumbwheel for adjusting the voltage and cannot identify the type of cell to which they are connected. There are also charging devices that can recognize the type of cell to which they are connected; these latter devices are complicated and costly.

SUMMARY OF THE INVENTION

The aim of the invention is to solve the new problem of charging different cells using the same charger, and in particular the problem of charging lithium batteries with charging voltages of 4.2 volts, 4.1 volts and 4.0 volts using existing 4.2 volt chargers.

The present invention proposes a novel and simple solution to this problem. It provides a low-cost solution that is easily fitted to all types of cell.

To be more precise, the invention proposes a cell charging voltage adapter circuit including connecting terminals of the cell connected to output terminals, a variable resistor between one of the connecting terminals and one of the output terminals and comparator means between the connecting terminals and adapted to control the variable resistor in accordance with the results of comparing the voltage between the connecting terminals and a nominal voltage.

The comparator means are preferably adapted to control the variable resistor so that the voltage between the connecting terminals is equal to the nominal voltage.

The circuit advantageously includes a diode in parallel with the variable resistor adapted to conduct in the direction from the connecting terminal to the output terminal.

In one embodiment the variable resistor is a transistor, preferably a MOSFET.

The comparator means can include an operational amplifier adapted to compare the voltage between the connecting terminals and the voltage supplied by a voltage source.

The comparator means can equally include a voltage divider connected between the connecting terminals, a voltage source and an operational amplifier adapted to compare the voltage supplied by the voltage divider and the voltage supplied by the voltage source.

The invention also concerns a battery comprising at least one cell and a charging voltage adapter circuit, the circuit including connecting terminals connected to the terminals of the cell or cells, connected to output terminals, a variable resistor between one of the connecting terminals and one of the output terminals, and comparator means between the connecting terminals and adapted to control the variable resistor in accordance with the results of comparing the voltage between the connecting terminals and a nominal voltage.

The nominal voltage is advantageously the nominal charging voltage of the cell.

The adapter circuit is preferably an integrated circuit mounted on a casing of the battery.

In one embodiment the comparator means are adapted to control the variable resistor so that the voltage between the terminals of the cell or cells is equal to the nominal voltage.

In another embodiment the circuit includes a diode in parallel with the variable resistor and adapted to conduct in the direction from the connecting terminal to the output terminal.

The variable resistance is advantageously a transistor, preferably a MOSFET.

The comparator means can include an operational amplifier adapted to compare the voltage between the terminals of the cell or cells and the voltage supplied by a voltage source. They can equally include a voltage divider connected between the connecting terminals, a voltage source and an operational amplifier adapted to compare the voltage supplied by the voltage divider and the voltage supplied by the voltage source.

BRIEF DESCRIPTION OF THE DRAWINGS

Other features and advantages of the invention will become apparent from a reading of the following description of embodiments of the invention given by way of example and with reference to the accompanying drawings, in which:

FIG. 1 is a schematic representation of a charging voltage adapter circuit of the invention;

FIG. 2 is a schematic representation of one embodiment of a charging voltage adapter circuit of the invention;

FIG. 3 is a schematic representation of another embodiment of a charging voltage adapter circuit of the invention; and FIG. 4 is a representation of a battery in accordance with the invention.

DETAILED DESCRIPTION OF THE INVENTION

FIG. 1 is a schematic representation of a charging voltage adapter circuit 1 in accordance with the invention. This circuit matches a cell to the charging voltage of a charger having a charging voltage greater than the nominal charging voltage of the cell.

The circuit has two connecting terminals 2 and 3 for connection to the negative and positive poles, respectively, of a cell 4 and two output terminals 6 and 7 for connection to the negative and positive poles, respectively, of a charger that is not shown in the figure. The circuit includes a variable resistor 8 between the terminals 3 and 7; it has between the terminals 2 and 3, i.e. in parallel with the cell, means 10 for comparing the voltage at the terminals of the cell and the nominal charging voltage of the cell; the comparator means control the variable resistor 8 according to the comparison results.

The FIG. 1 circuit operates as follows: when the cell 4 and the charger are connected to the respective terminals of the circuit 1, the comparator means compare the voltage at the terminals of the cell to the nominal charging voltage of the cell and control the value of the variable resistor 8 according to the comparison results; the variable resistor 8 reduces the voltage at the terminals of the cell to the nominal charging voltage. Accordingly, throughout the charging of the cell, and regardless of the charging current, the voltage at the terminals of the cell remains less than or equal to the nominal charging voltage.

Consider for example a charger delivering a charging voltage of 4.2 volts and a cell operating at a voltage of 4.1 volts; in this case the charging current typically varies between 0.005 amperes and 2 amperes. The resistance of the variable resistor 8 can vary between 0 ohms and 20 ohms, to induce a voltage drop of 0.1 volt.

The FIG. 1 circuit enables a correct charging voltage to be applied to charge the cell. It has no effect on the charging time or the charging current. The circuit can be fitted to existing cell designs and does not require the provision on the latter of any additional terminal for identifying the cell or to enable separate charging and discharging.

The size of the FIG. 1 circuit means that it can be installed on the casing of a cell to match the cell to a charger operating at a voltage greater than the nominal charging voltage of the cell. In the FIG. 3 embodiment the adapter circuit is only 1.75 mm thick with an area of 1 cm$^2$.

In this case the circuit 1 advantageously has in parallel with the variable resistor 8 a diode 12 enabling current to flow from the terminal 3 to the terminal 7. After the cell has been charged using the adapter circuit from FIG. 1 the device to be powered can be connected directly to terminals 6 and 7 of the adapter circuit: the cell then discharges normally via the diode 12 which induces only a minimal voltage drop.

The circuit can also operate without the diode 12, in that the discharge voltage of the cell is substantially lower than the nominal charging voltage; accordingly, as soon as discharging begins, the comparator means adjust the variable resistor to a low or null value. The voltage drop across the variable resistor is then minimal.

The invention enable batteries or cells of different types to be supplied with a single design of charger, nevertheless assuring that the various cells are charged at the nominal charging voltage.

FIG. 2 is a schematic representation of another embodiment of a charging voltage adapter circuit of the invention; reference numbers identical to those of FIG. 1 designate the same components, which are not described again. The comparator means shown in FIG. 2 comprise an operational amplifier 15 receiving a reference voltage from a voltage source 16; the non-inverting terminal of the amplifier 15 is connected to the terminal 3 connected to the positive terminal of the cell; the inverting input of the amplifier is connected to the positive terminal of the reference voltage source 16. The negative terminal of the reference voltage source is connected to the terminal 4 connected to the negative terminal of the cell. The output terminal of the operational amplifier is connected to the variable resistor 8. Thus the comparator means are connected in parallel with the cell and include an operational amplifier comparator in series with a voltage source supplying the nominal charging voltage of the cell. This voltage source can be a semiconductor device known in itself which is biased to the nominal charging voltage of the cell.

The variable resistor 8 can be a transistor, for example a MOSFET. The size of the transistor is matched to the required voltage drop and to the current supplied by the charger. A MOSFET is particularly advantageous in that the diode 12 is integral with the transistor and does not have to be added separately.

FIG. 3 is a schematic representation of another embodiment of a charging voltage adapter circuit of the invention. Reference numbers identical to those of FIGS. 1 and 2 again designate the same components, which are not described again. The FIG. 3 circuit is identical to that of FIG. 2 except that the non-inverting input of the operational amplifier is connected to terminal 3 via a resistor voltage divider, rather than directly. To be more precise, two series-connected resistors 13 and 14 are connected between the connecting terminals and the non-inverting input of the operational amplifier is connected between the two resistors 13 and 14. The FIG. 3 circuit compares the voltage supplied by the reference source 16 to the product of the voltage between the connecting terminals and a factor $R_{14}/(R_{13}+R_{14})$, where $R_{13}$ and $R_{14}$ are the resistance values of the resistors 13 and 14.

The operation of the FIG. 3 circuit is similar to that of the FIG. 2 circuit. However, the presence of the resistors procures the following advantages. Firstly, it is possible to use the same circuit for different values of the nominal charging voltage of the cell: it is then sufficient to vary the relative values of the two resistors, without it being necessary to modify the voltage source. Secondly, the FIG. 3 circuit enables the use of a standard voltage source 16 delivering a voltage of 1.25 volts or 2.5 volts; appropriate choice of the resistors 13 and 14 adjusts the nominal charging voltage of the cell.

FIG. 4 is a schematic of a battery in accordance with the invention, opened up, including a charging current adapter circuit of the invention and, in this example, a single cell.

FIG. 4 shows the casing 17 of the battery with its two terminals 18 and 19. The battery casing contains a cell 20 and a charging current adapter circuit 21. The output terminals 6 and 7 of the charging current adapter circuit are respectively connected to the terminals 18 and 19 of the battery; the connecting terminals of the circuit are connected to the terminals of the cell. The figure shows a connecting terminal of the charging current adapter circuit connected to the container of the cell by a soldered jumper 22. The other connecting terminal is connected to the pole on the top of the cell, as shown by the contact 23. The choice of the connecting terminal depends on the type of cell (container negative or positive). The circuit and the cell are mounted in the battery casing by gluing or by any similar technique. Clearly a plurality of series-connected cells can be used in a battery. Finally, some lithium batteries have protection circuits: in this case the charging current adapter circuit of the invention can optionally be integrated into the existing protection circuit.

Of course, the present invention is not limited to the examples and embodiments described and shown, but lends itself to many variants obvious to the skilled person. Accordingly, it is clear that in the FIG. 1 embodiment, as in that of FIG. 2, the variable resistor could equally well be connected between the terminals 2 and 6, without the operation of the circuit being modified in any way. Similarly, the inverting input of the amplifier could be connected to the reference voltage source via a voltage divider circuit: the combination of the source and the voltage divider would form an easily adjustable reference voltage source.

Finally, the invention has been described in the case of Li-ion batteries with a charging voltage of 4.2 volts, 4.1 volts or 4.0 volts. It applies to other types of battery and to other charging voltages.

I claim:

1. A circuit comprising:
   a cell voltage adapter for charging a cell, said charging adapter including
   connecting terminals of a cell connected to output terminals, a variable resistor between one of the connecting terminals and one of the output terminals; and a comparator connected between the connecting terminals for controlling the variable resistor in accordance with the results of comparing the voltage between the connecting terminals and a nominal voltage.

2. A circuit according to claim 1, wherein the comparator is adapted to control the variable resistor so that the voltage between the connecting terminals is equal to the nominal voltage.

3. A circuit according to claim 1, further comprising: a diode in parallel with the variable resistor and adapted to conduct in the direction from the connecting terminal to the output terminal.

4. A circuit according to claim 1, characterized in that the variable resistor is a transistor.

5. A circuit according to claim 4, wherein said transistor is a MOSFET.

6. A circuit according to claim 1, wherein the comparator includes an operational amplifier for comparing the voltage between the connecting terminals and the voltage supplied by a voltage source.

7. A circuit according to claim 1, wherein the comparator includes a voltage divider connected between the connecting terminals, a voltage source and an operational amplifier for comparing the voltage supplied by the voltage divider and the voltage supplied by the voltage source.

8. A battery comprising:

at least one cell and a charging voltage adapter circuit, the circuit including connecting terminals connected to the terminals of at least one cell, and connected to output terminals, a variable resistor connected between one of the connecting terminals and one of the output terminals, and a comparator connected between the connecting terminals for controlling the variable resistor in accordance with the results of comparing the voltage between the connecting terminals and a nominal voltage.

9. A battery according to claim 8, wherein the nominal voltage is the nominal charging voltage of the cell.

10. A battery according to claim 8, wherein the adapter circuit is an integrated circuit mounted on a casing of the battery.

11. A battery according to claim 8, the comparator controls the variable resistor so that the voltage between the terminals of the at least one cell is equal to the nominal voltage.

12. A battery according to claim 8, wherein the circuit further includes a diode in parallel with the variable resistor that conduct in the direction from the connecting terminal to the output terminal.

13. A battery according to claim 8, wherein the variable resistance is a transistor.

14. A circuit according to claim 13, wherein said transistor is a MOSFET.

15. A battery according to claim 8, wherein the comparator an operational amplifier comparing the voltage between the terminals of at least one cell and the voltage supplied by a voltage source.

16. A battery according to claim 8, wherein the comparator includes a voltage divider connected between the connecting terminals, a voltage source and an operational amplifier comparing the voltage supplied by the voltage divider and the voltage supplied by the voltage source.

* * * * *